United States Patent
Ko

(10) Patent No.: US 9,303,783 B1
(45) Date of Patent: Apr. 5, 2016

(54) CONTROL DEVICE FOR ANTI-FREEZE FAUCET

(71) Applicant: Chih Han Ko, Changhua (TW)

(72) Inventor: Chih Han Ko, Changhua (TW)

(*) Notice: Subject to any disclaimer, the term of this patent is extended or adjusted under 35 U.S.C. 154(b) by 0 days.

(21) Appl. No.: 14/567,185

(22) Filed: Dec. 11, 2014

(30) Foreign Application Priority Data

Sep. 26, 2014  (TW) .............................. 103217142 U

(51) Int. Cl.
| | | |
|---|---|---|
| *E03B 9/02* | (2006.01) | |
| *F16K 31/50* | (2006.01) | |
| *F16K 1/02* | (2006.01) | |

(52) U.S. Cl.
CPC .. *F16K 31/50* (2013.01); *F16K 1/02* (2013.01)

(58) Field of Classification Search
CPC ..................... Y10T 137/3331; Y10T 137/698; E03B 9/025; F16K 31/50
USPC ......... 137/59, 218, 301, 302, 303, 360, 454.5
See application file for complete search history.

(56) References Cited

U.S. PATENT DOCUMENTS

| | | | | |
|---|---|---|---|---|
| 1,317,789 A | * | 10/1919 | Hoar ........................ | E03C 1/042 137/360 |
| 3,424,189 A | * | 1/1969 | Woodford ................. | E03B 7/12 137/218 |
| 3,929,150 A | * | 12/1975 | Flinner ..................... | E03B 7/12 137/218 |
| 5,392,805 A | * | 2/1995 | Chrysler .................. | E03B 9/025 137/218 |
| 5,697,393 A | | 12/1997 | Mirlisena, Sr. | |
| 7,896,024 B2 | * | 3/2011 | Korb ........................ | E03B 9/025 137/218 |
| 7,975,720 B2 | | 7/2011 | Conway | |
| 8,613,290 B1 | | 12/2013 | Wu | |
| 2013/0284280 A1 | * | 10/2013 | Hoeptner .................. | E03B 7/10 137/59 |

* cited by examiner

*Primary Examiner* — John K Fristoe, Jr.
*Assistant Examiner* — Reinaldo Sanchez-Medina
(74) *Attorney, Agent, or Firm* — Charles E. Baxley

(57) ABSTRACT

An anti-freeze faucet includes a receptacle having a valve seat, a housing engaged onto the receptacle and having a mouth piece, a cap attached to the mouth piece and having a non-circular inner peripheral portion, a stem rotatably engaged in the cap and having a threaded shank, a non-circular follower engaged in the cap and slidably engaged with the non-circular inner peripheral portion of the cap for guiding and limiting the follower to move longitudinally relative to the cap only and for preventing the follower from being rotated relative to the cap, and the follower includes an inner thread for threading with the threaded shank of the stem, a rod and a valve piece are attached to the follower for engaging with the valve seat of the receptacle.

6 Claims, 4 Drawing Sheets

US 9,303,783 B1

CONTROL DEVICE FOR ANTI-FREEZE FAUCET

BACKGROUND OF THE INVENTION

1. Field of the Invention

The present invention relates to an anti-freeze faucet, and more particularly to an anti-freeze faucet including an improved control device having a sliding follower for easily and quickly actuating or operating the anti-freeze faucet to open or release or to block the water flowing through the anti-freeze faucet and for increasing the working life of the anti-freeze faucet.

2. Description of the Prior Art

Typical anti-freeze faucets are normally used and worked in the frigid or freezing environment for preventing the water from being frozen and expanded within the faucet and for preventing the faucet from being broken or damaged by the frozen and expanded water, and normally comprise a valve mechanism formed or provided in the faucet for selectively and automatically releasing the water.

For example, U.S. Pat. No. 5,697,393 to Mirlisena, Sr., U.S. Pat. No. 7,975,720 to Conway, and U.S. Pat. No. 8,613,290 to Wu disclose several of the typical anti-freeze faucets each also comprising an actuating or control device for actuating or operating the anti-freeze faucet to open or release or to block the water flowing through the anti-freeze faucet, and a valve structure or mechanism formed or provided in the faucet mechanism for selectively and automatically releasing the water and for preventing the faucet from being broken or damaged by the frozen and expanded water.

However, the control device for actuating or operating the anti-freeze faucet includes a complicated structure that may not be used to easily and quickly actuate or operate the anti-freeze faucet by the user, or the user may have to work hard to actuate or operate or rotate the control device in order to actuate or operate the anti-freeze faucet.

The present invention has arisen to mitigate and/or obviate the afore-described disadvantages of the conventional anti-freeze faucets.

SUMMARY OF THE INVENTION

The primary objective of the present invention is to provide an anti-freeze faucet including an improved control device having a sliding follower for easily and quickly actuating or operating the anti-freeze faucet to open or release or to block the water flowing through the anti-freeze faucet and for increasing the working life of the anti-freeze faucet.

In accordance with one aspect of the invention, there is provided an anti-freeze faucet comprising a receptacle including a first or lower end portion and a second or upper end portion, and including a chamber formed therein, and including a valve seat provided in the first or lower end portion of the receptacle, a housing engaged onto the second end portion of the receptacle, the housing including a compartment formed therein and communicating with the chamber of the receptacle for receiving a water from the chamber and the first or lower end portion of the receptacle, the housing including a mouth piece communicating with the compartment of the housing, a cap attached to the mouth piece of the housing, the cap including a space formed therein and having a non-circular inner peripheral portion, a rotary stem rotatably engaged in the cap, the stem including a threaded shank, a non-circular follower slidably received and engaged in the space of the cap and slidably engaged with the non-circular inner peripheral portion of the cap for guiding and limiting the follower to move longitudinally relative to the cap only and for preventing the follower from being rotated relative to the cap, and the follower including an inner thread formed in the follower for threading and engaging with the threaded shank of the stem, a rod attached to the follower and moved in concert with the follower, a valve piece attached to the rod for selectively engaging with the valve seat of the receptacle and for selectively enclosing and opening the valve seat of the receptacle, and a control knob attached to the stem for rotating the stem relative to the cap and for selectively actuating and moving the valve piece toward and away from the valve seat of the receptacle.

The cap includes an outer peripheral flange extended radially and outwardly from the middle or intermediate portion of the cap for contacting or engaging with the mouth piece of the housing and for solidly and stably retaining or anchoring and positioning the cap to the housing.

The cap includes an opening formed therein and communicating with the space of the cap and having an inner diameter smaller than that of the space of the cap for forming an inner peripheral shoulder between the space and the opening of the cap.

The stem includes an outer peripheral flange extended radially and outwardly from the stem for engaging with the inner peripheral shoulder of the cap and for anchoring or positioning the stem to the cap and for preventing the stem from sliding longitudinally relative to the cap.

The stem includes at least one sealing ring engaged onto the stem and engaged with the cap and for making a water tight seal between the cap and the stem and for preventing the water from leaking out through the space between the cap and the stem. The follower includes an engaging element engaged with the rod for securing and coupling the rod to the follower.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
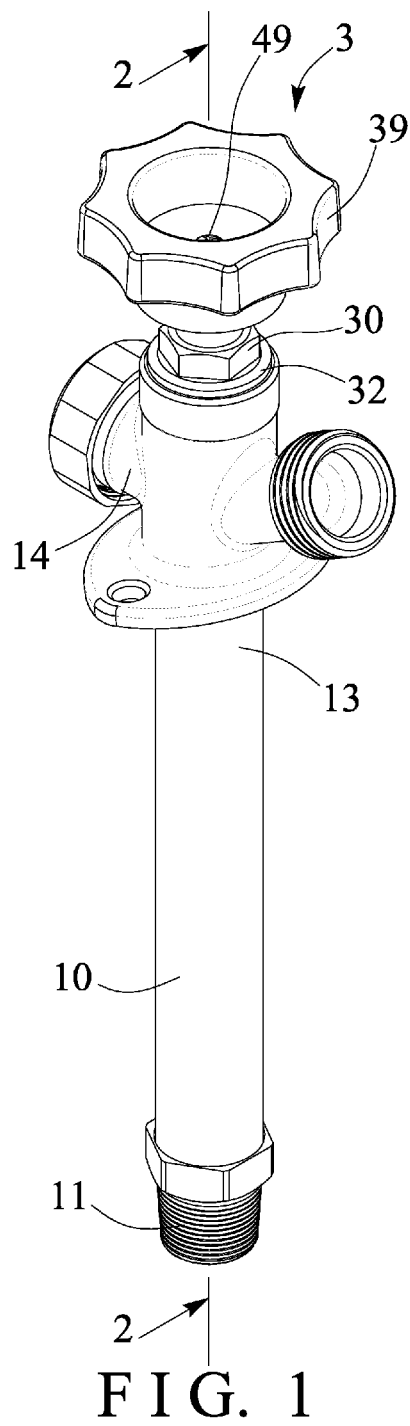
FIG. 1 is a perspective view of an anti-freeze faucet in accordance with the present invention.
Figure 2:
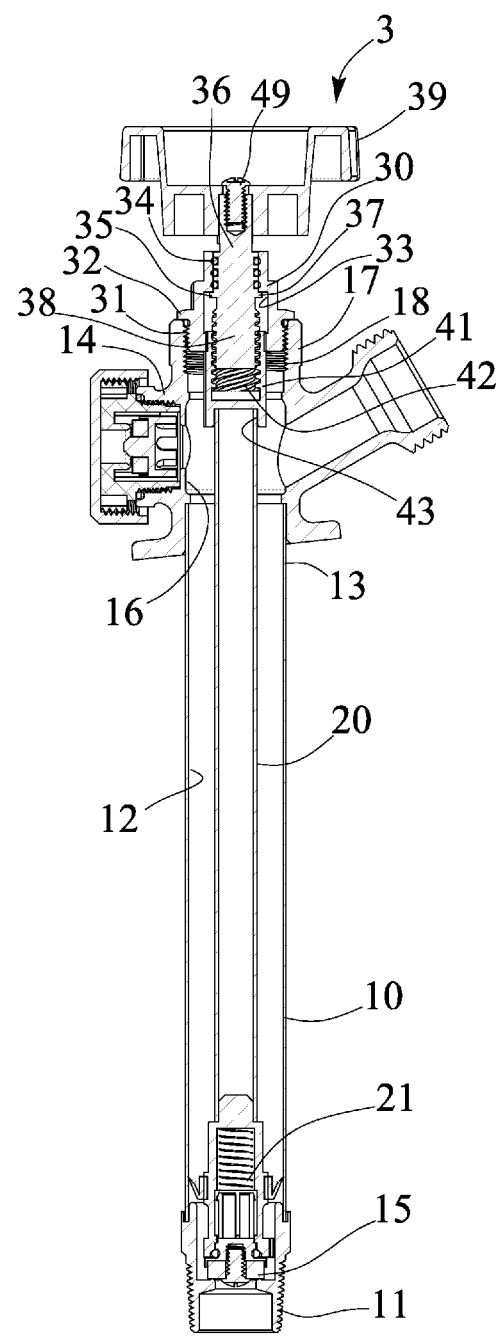
FIG. 2 is a partial cross sectional view of the anti-freeze faucet, taken along lines 2-2 of FIG. 1.

Referring to the drawings, and initially to FIGS. 1 and 2, an anti-freeze faucet in accordance with the present invention comprises an outer hose or conduit or cylindrical or tubular member or receptacle 10 including one or first or lower end portion 11 for connecting or coupling to a water tank or reservoir (not illustrated), and for receiving or obtaining the water or fluid from the water reservoir, and including a compartment or chamber 12 formed therein, and including another or second or upper end portion 13 having a faucet container or housing 14 formed or provided thereon, and including a valve seat 15 (FIG. 2) formed or provided therein, such as formed or provided in the first or lower end portion 11 thereof. The housing 14 includes a chamber or compartment 16 formed therein and communicating with the chamber 12 of the receptacle 10.

The anti-freeze faucet further includes a pole or rod 20 slidably received or engaged in the chamber 12 of the receptacle 10, and includes a soft or resilient plug or valve piece 21 attached or mounted or secured to the lower or bottom portion of the rod 20 for selectively contacting or engaging with the valve seat 15 of the receptacle 10 and for selectively blocking or enclosing or opening the valve seat 15 of the receptacle 10, and thus for controlling or opening or releasing or blocking the water to flow through the anti-freeze faucet. The above-described structure or configuration for the contacting or engaging of the valve piece 21 with the valve seat 15 of the receptacle 10 is not related to the present invention and will not be described in further details.

The anti-freeze faucet further includes a control structure or mechanism 3 disposed or engaged into the upper portion 13 of the receptacle 10 or the housing 14 for engaging with the rod 20 and for actuating or operating the rod 20 and thus the valve piece 21 to engage with the valve seat 15 of the receptacle 10. The housing 14 includes a mouth piece 17 having a screw hole or inner thread 18 formed therein and communicating with the compartment 16 of the housing 14. The control mechanism 3 includes a lid or cap 30 having an outer thread 31 formed or provided on the outer peripheral portion thereof for threading or engaging with the corresponding inner thread 18 of the mouth piece 17 or of the housing 14 (FIG. 2) and for solidly and stably attaching or mounting or securing the cap 30 onto the housing 14 and for preventing the cap 30 from being disengaged from the housing 14.

It is preferable that the cap 30 includes an outer peripheral rib or flange 32 extended radially and outwardly from the middle or intermediate portion of the cap 30 for contacting or engaging with the housing 14 and for further solidly and stably anchoring or retaining or positioning the cap 30 onto the housing 14 and for further preventing the cap 30 from being disengaged from the housing 14, the cap 30 further includes a chamber or compartment or space 33 formed therein, and includes an orifice or aperture or opening 34 formed therein and communicating with the space 33 thereof and having an inner diameter smaller than that of the space 33 of the cap 30 for forming or defining an inner peripheral surface or shoulder 35 between the space 33 and the opening 34 of the cap 30.

The control mechanism 3 further includes a pivotal or rotary stem 36 engaged into the cap 30, such as engaged through the space 33 and the opening 34 of the cap 30, and the stem 36 includes an outer peripheral flange 37 extended radially and outwardly from the middle or intermediate portion of the stem 36 for contacting or engaging with the inner peripheral shoulder 35 of the cap 30 and for solidly and stably anchoring or retaining or positioning the stem 36 to the cap 30 and for preventing the stem 36 from moving or sliding longitudinally relative to the cap 30, and the stem 36 includes an outer thread or threaded shank 38 formed or provided thereon or extended downwardly therefrom and located or engaged in the space 33 of the cap 30.

A control hand grip or knob 39 is threaded attached or mounted or secured or coupled to the upper portion of the stem 36 with a lock or fastener 49 (FIGS. 1-2) or the like and moved in concert with the stem 36 for selectively actuating or operating or rotating the stem 36 relative to the cap 30 and the housing 14 and/or the receptacle 10. It is preferable that one or more gaskets or sealing rings 40 are attached or mounted or secured or engaged onto the middle or intermediate portion of the stem 36 for contacting or engaging with the inner peripheral surface of the cap 30 and for making a water tight seal between the cap 30 and the stem 36 and for preventing the water from leaking out through the space between the cap 30 and the stem 36.

The control mechanism 3 further includes a stud or sliding member or follower 41 having a screw hole or inner thread 42 formed or provided therein, such as formed or provided in the upper portion thereof for threading or engaging with the corresponding outer thread or threaded shank 38 of the stem 36, and the follower 41 includes an attachment or engaging element 43, such as an engaging depression 43 formed or provided in the lower portion of the follower 41 for contacting or engaging with the upper portion of the rod 20 and for solidly and stably attaching or mounting or securing the rod 20 to the follower 41 with adhesive materials or the like and for allowing the rod 20 and the follower 41 to be moved in concert with each other.

Figures 3, 4:
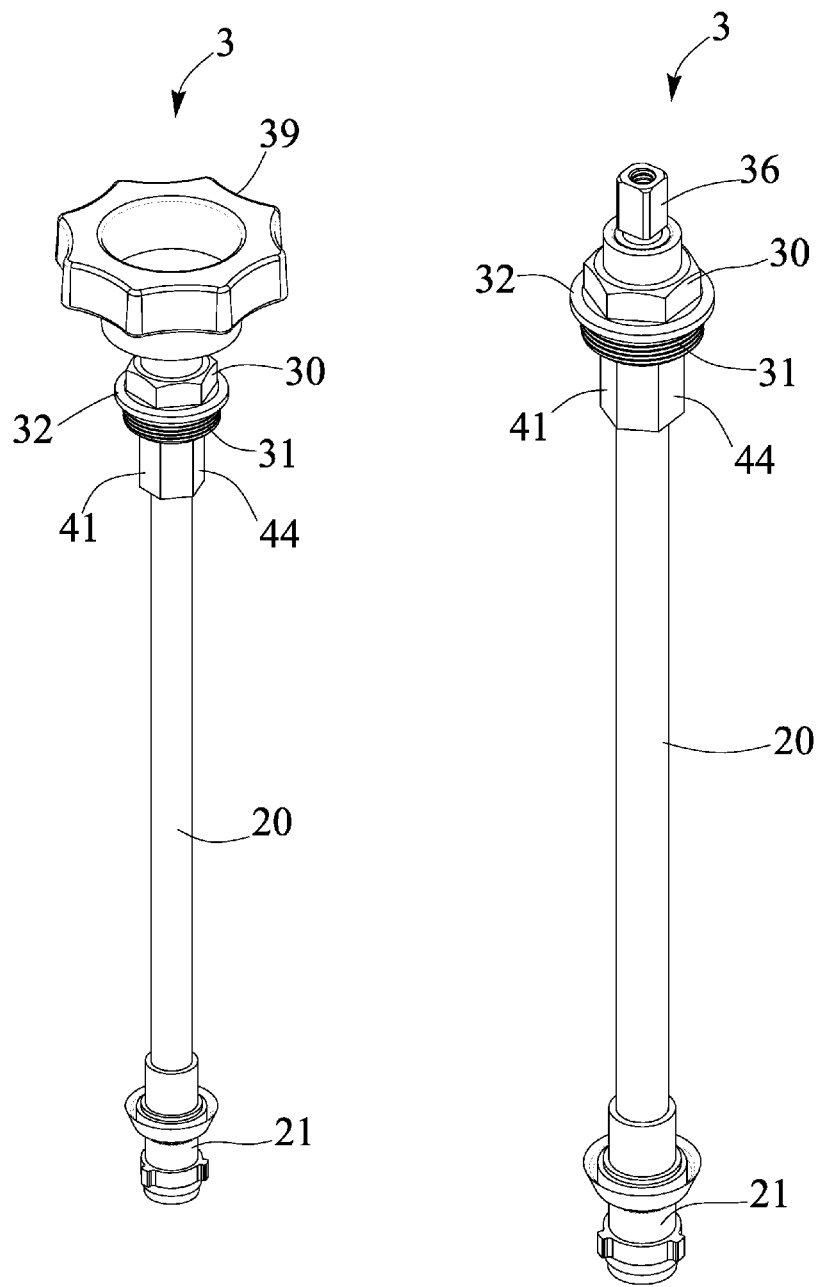
FIG. 3 is a partial perspective view of the anti-freeze faucet, in which some of the outer parts or elements have been removed for illustrating the inner structure of the anti-freeze faucet.
FIG. 4 is another partial perspective view of the anti-freeze faucet, in which some of the outer housings or parts or elements have been removed for illustrating the inner structure of the anti-freeze faucet.
Figure 5:
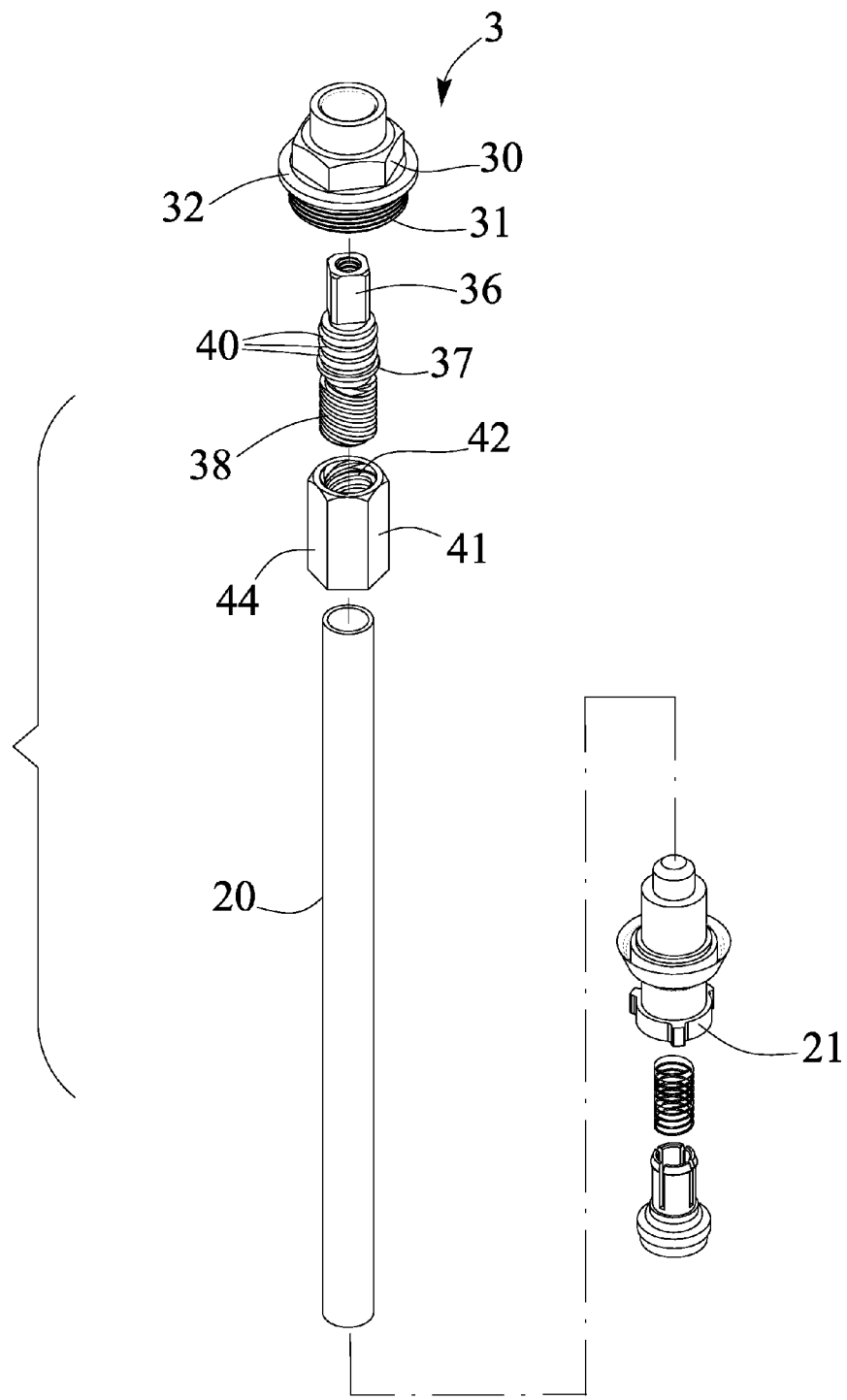
FIG. 5 is a partial exploded view of the anti-freeze faucet.
Figure 6:
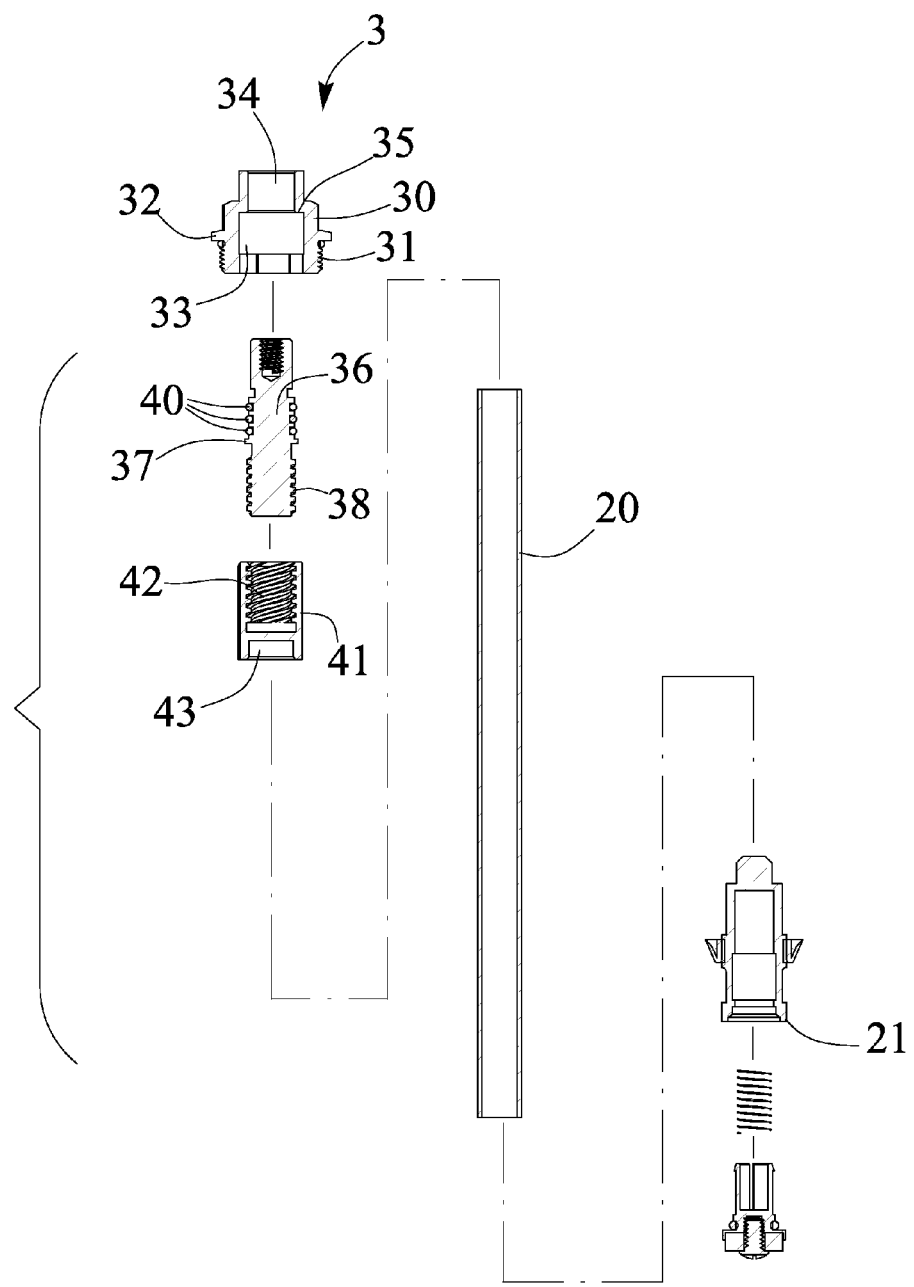
FIG. 6 is another partial exploded and 1 cross sectional view illustrating the operation of the anti-freeze faucet.

As shown in FIGS. 3-5, the follower 41 includes a non-circular cross section or a non-circular outer peripheral portion or surface 44 formed thereon, and the cap 30 includes a non-circular inner peripheral portion or surface 45 formed or provided thereon (FIG. 6) for slidably engaging with the corresponding non-circular outer peripheral portion or surface 44 of the follower 41 for preventing the follower 41 from being pivoted or rotated relative to the cap 30, and for guiding and limiting the follower 41 to move or slide longitudinally relative to the cap 30 only, and thus for actuating or operating or moving the valve piece 21 to selectively contact or engage with the valve seat 15 of the receptacle 10 (FIG. 2) and to selectively block or enclose or open the water flowing passage in the lower end portion 11 of the receptacle 10.

In operation, as shown in FIG. 2, the stem 36 is selectively rotatable or actuatable or operatable relative to the cap 30 and the housing 14 and/or the receptacle 10 with the control knob 39, and the follower 41 and thus the rod 20 may be actuated or operated or moved toward or away from the valve seat 15 of the receptacle 10 when the stem 36 is pivoted or rotated relative to the cap 30 with the control knob 39, and the valve piece 21 may thus be actuated or operated or moved to selectively contact or engage with the valve seat 15 of the receptacle 10 and to selectively block or enclose or open the water flowing passage in the lower end portion 11 of the receptacle 10. It is only required to actuate or operate or rotate the control knob 39 and/or the stem 36 relative to the cap 30 for about ninety (90) to one hundred and eighty (180) degrees in order to actuate or operate or move the valve piece 21 toward or away from the valve seat 15 of the receptacle 10.

Accordingly, the anti-freeze faucet in accordance with the present invention includes an improved control device having a sliding follower for easily and quickly actuating or operating the anti-freeze faucet to open or release or to block the water flowing through the anti-freeze faucet and for increasing the working life of the anti-freeze faucet.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An anti-freeze faucet comprising:

a receptacle including a first end portion and a second end portion, and including a chamber formed therein, and including a valve seat provided in said first end portion of said receptacle, a housing engaged onto said second end portion of said receptacle, said housing including a compartment formed therein and communicating with said chamber of said receptacle for receiving a water from said chamber of said receptacle, said housing including a mouth piece communicating with said compartment of said housing, a cap attached to said mouth piece of said housing, said cap including a space formed therein and having a non-circular inner peripheral portion, a rotary stem rotatably engaged in said cap, said stem including a threaded shank, a non-circular follower slidably received and engaged in said space of said cap and slidably engaged with said non-circular inner peripheral portion of said cap for guiding and limiting said follower to move longitudinally relative to said cap only and for preventing said follower from being rotated relative to said cap, and said follower including an inner thread formed in said follower for threading and engaging with said threaded shank of said stem, a rod attached to said follower and moved in concert with said follower, a valve piece attached to said rod for selectively engaging with said valve seat of said receptacle and for selectively enclosing and opening said valve seat of said receptacle, and a control knob attached to said stem for rotating said stem relative to said cap and for selectively actuating and moving said valve piece toward and away from said valve seat of said receptacle.

2. The anti-freeze faucet as claimed in claim 1, wherein said cap includes an outer peripheral flange extended radially and outwardly from said cap and engaged with said mouth piece of said housing for anchoring and positioning said cap to said housing.

3. The anti-freeze faucet as claimed in claim 1, wherein said cap includes an opening formed therein and communicating with said space of said cap and having an inner diameter smaller than that of said space of said cap for forming an inner peripheral shoulder between said space and said opening of said cap.

4. The anti-freeze faucet as claimed in claim 3, wherein said stem includes an outer peripheral flange extended radially and outwardly from said stem for engaging with said inner peripheral shoulder of said cap and for positioning said stem to said cap and for preventing said stem from sliding longitudinally relative to said cap.

5. The anti-freeze faucet as claimed in claim 1, wherein said stem includes at least one sealing ring engaged onto said stem and engaged with said cap and for making a water tight seal between said cap and said stem.

6. The anti-freeze faucet as claimed in claim 1, wherein said follower includes an engaging element engaged with said rod for securing said rod to said follower.

* * * * *